(12) United States Patent
Greene et al.

(10) Patent No.: US 9,409,649 B2
(45) Date of Patent: Aug. 9, 2016

(54) DETECTION OF ICING CONDITIONS ON AN AIRCRAFT

(71) Applicant: Safe Flight Instrument Corporation, White Plains, NY (US)

(72) Inventors: Randall A. Greene, Greenwich, CT (US); Peter R. Cordes, Brookfield, CT (US); Robert D. Teter, Hopewell Junction, NY (US)

(73) Assignee: SAFE FLIGHT INSTRUMENT CORPORATION, White Plains, NY (US)

( * ) Notice: Subject to any disclaimer, the term of this patent is extended or adjusted under 35 U.S.C. 154(b) by 403 days.

(21) Appl. No.: 13/715,911

(22) Filed: Dec. 14, 2012

(65) Prior Publication Data

US 2014/0166813 A1 Jun. 19, 2014

(51) Int. Cl.
*B64D 15/20* (2006.01)

(52) U.S. Cl.
CPC ...................... *B64D 15/20* (2013.01)

(58) Field of Classification Search
CPC ........ B64D 15/20; B64D 15/22; B64D 15/00; B64D 15/12; B64F 5/0054
USPC .................. 244/134 F, 134 D, 134 R; 701/14; 219/203; 356/445, 72, 73
See application file for complete search history.

(56) References Cited

U.S. PATENT DOCUMENTS

| | | | |
|---|---|---|---|
| 4,327,286 A * | 4/1982 | Thoma ........................ | 250/231.1 |
| 4,656,333 A | 4/1987 | Murphy | |
| 4,797,660 A * | 1/1989 | Rein, Jr. ........................ | 340/583 |
| 5,057,666 A * | 10/1991 | Takada ........................... | 219/203 |
| 5,496,989 A * | 3/1996 | Bradford et al. ............... | 219/497 |
| 5,710,408 A | 1/1998 | Jones | |
| 5,748,091 A * | 5/1998 | Kim ............................... | 340/583 |
| 6,091,335 A * | 7/2000 | Breda et al. ................... | 340/580 |
| 6,144,017 A * | 11/2000 | Millett et al. .................. | 219/522 |
| 6,425,286 B1 * | 7/2002 | Anderson et al. ........... | 73/170.26 |
| 6,430,996 B1 * | 8/2002 | Anderson et al. ........... | 73/170.26 |
| 7,602,496 B2 * | 10/2009 | Harsh et al. ................... | 356/445 |
| 7,652,767 B2 * | 1/2010 | Harsh et al. ................... | 356/445 |
| 2004/0206854 A1 | 10/2004 | Shah et al. | |
| 2006/0086715 A1 * | 4/2006 | Briggs ........................... | 219/488 |
| 2008/0055095 A1 * | 3/2008 | Hackmeister ................. | 340/583 |

FOREIGN PATENT DOCUMENTS

| | | |
|---|---|---|
| GB | 2056057 | 3/1981 |
| GB | 2271190 | 4/1994 |

OTHER PUBLICATIONS

United Kingdom Intellectual Property Office Search Report for UK Patent Application No. 1322126.2, mailed Aug. 14, 2014, 3 pages.

* cited by examiner

*Primary Examiner* — Philip J Bonzell

(74) *Attorney, Agent, or Firm* — Morrison & Foerster LLP

(57) ABSTRACT

A controller for determining when icing conditions are present on an outside surface of an aircraft may include a first input receiving a moisture condition on a windshield of the aircraft, a second input receiving an outside temperature, and an output that provides an icing condition determined as a function of the first input and the second input. The moisture condition can be provided by a moisture sensor positioned on an interior surface of the windshield and the windshield may include a heating system.

18 Claims, 4 Drawing Sheets

DETECTION OF ICING CONDITIONS ON AN AIRCRAFT

FIELD OF THE DISCLOSURE

This disclosure generally relates to systems and methods for detecting icing conditions on an aircraft. More particularly, this disclosure relates to systems and methods for detecting icing conditions by sensing moisture on the aircraft windshield and detecting an outside temperature at or below freezing.

BACKGROUND

Aircraft icing has been a concern almost since powered flight began. There have been hundreds of fatal accidents where aircraft icing was the primary cause or a contributing factor. A few of the more notable icing induced accidents within the last twenty years include American Eagle Flight 4184 near Chicago, Ill., Colgan Air Flight 3407 near Buffalo, N.Y., and Air France Flight 447 over the South Atlantic. Each one of these incidents resulted in the loss of all passengers and crew on board.

There are a variety of known icing condition detectors for aircraft. These include sensors with vibrating elements (frequency changes with ice accretion) and rotating elements (electrical load increases in icing conditions). Other sensors detect icing conditions by sensing moisture along with temperatures below freezing.

However, conventional electro-mechanical aircraft icing condition detectors require a probe or optical element to protrude from the outside of the aircraft. Undesirably, these probes or optical elements typically require adding a hole to the aircraft's fuselage to receive the probe or optical element, thereby compromising the structural integrity of the aircraft.

SUMMARY

This disclosure relates to systems and methods for detecting icing conditions on an aircraft. Advantageously, the systems and methods do not necessitate adding a hole to the aircraft's fuselage. In some embodiments, a moisture sensor is attached to an interior surface of the aircraft windshield and icing conditions are determined when (1) moisture is detected and (2) the outside air temperature is at or below freezing.

In one embodiment, an aircraft icing conditions detection system may include a moisture sensor, an outside temperature sensor, and a controller that determines when icing conditions are present as a function of signals received from the moisture sensor and outside temperature sensor. The moisture sensor may be positioned on an interior windshield of the aircraft and the windshield may include a heating system. By positioning the moisture sensor on the interior surface of the windshield, there is no need to add holes to the aircraft. By utilizing the heating system in the windshield, frozen water on the windshield is melted, thereby allowing the moisture sensor to continue operating during ice and snow conditions.

In another embodiment, the detector may determine icing conditions are present when the moisture sensor determines moisture is present on the windshield and the outside temperature sensor determines the outside temperature is at or below freezing. In yet another embodiment, the moisture sensor may comprise an emitter and a detector relatively positioned so that light from the emitter is refracted at an outer surface of the windshield and detected by the detector. In other embodiments, the moisture sensor may not include an independent heating system that melts frozen water.

In some embodiments, the detector may activate a de-icing or anti-icing system on the aircraft when the controller determines that icing conditions are present. In some embodiments, the outside temperature sensor may include an air data computer.

In one embodiment, a controller for determining when icing conditions are present on an outside surface of an aircraft may include a first input receiving a moisture condition on a windshield of the aircraft, a second input receiving an outside temperature, and an output that provides an icing condition notification, wherein the icing condition is determined as a function of the first input and the second input. The moisture condition can be provided by a moisture sensor positioned on an interior surface of the windshield and the windshield may include a heating system. By positioning the moisture sensor on the interior surface of the windshield, there is no need to add holes to the aircraft. By utilizing the heating system in the windshield, frozen water on the windshield is melted, thereby allowing the moisture sensor to continue operating during ice and snow conditions.

In another embodiment, the icing condition can be determined when the first input indicates that moisture is present on the windshield and the second input indicates that the outside temperature is at or below freezing. In yet another embodiment, the moisture condition can be determined using an emitter and a detector relatively positioned so that light from the emitter is refracted at an outer surface of the windshield and detected by the detector.

In some embodiments, the output can include a signal to a de-icing or anti-icing system in the aircraft to initiate de-icing or anti-icing. In some embodiments, the second input can be provided by an air data computer aboard the aircraft.

In one embodiment, a method of detecting icing conditions on an aircraft may include determining when moisture is present on a windshield of the aircraft, determining an outside temperature, and determining icing conditions are present as a function of the presence of moisture on the windshield and the outside temperature. The moisture sensor may be positioned on an interior surface of the windshield and the windshield may include a heating system. By positioning the moisture sensor on the interior surface of the windshield, there is no need to add holes to the aircraft. By utilizing the heating system in the windshield, frozen water on the windshield is melted, thereby allowing the moisture sensor to continue operating during ice and snow conditions.

In another embodiment, icing conditions can be determined when moisture is determined to be present on the windshield and the outside temperature is determined to be at or below freezing. In yet another embodiment, the presence of moisture can be determined using an emitter and a detector relatively positioned so that light from the emitter is refracted at an outer surface of the windshield and detected by the detector.

In some embodiments, the method may also include activating a de-icing or anti-icing system in the aircraft to initiate de-icing or anti-icing when icing conditions are determined to be present. In some embodiments, determining the outside temperature comprises accessing an air data computer.

DETAILED DESCRIPTION

In the following description of embodiments, reference is made to the accompanying drawings which form a part hereof, and in which it is shown by way of illustration specific embodiments in which the claimed subject matter may be practiced. It is to be understood that other embodiments may be utilized and structural changes may be made without departing from the scope of the claimed subject matter.

To reduce damage to the structural integrity of an aircraft's fuselage, the present disclosure describes an icing condition detection system that places a moisture sensor on the interior surface of an aircraft's windshield. To ensure that the icing condition detection system is operable during ice and snow conditions, the heating system in the windshield may be used to liquefy frozen water on the windshield.

In one embodiment, an aircraft icing conditions detection system may include a moisture sensor, an outside temperature sensor, and a controller that determines when icing conditions are present as a function of signals received from the moisture sensor and outside temperature sensor. The moisture sensor may be positioned on an interior windshield of the aircraft and the windshield may include a heating system. By positioning the moisture sensor on the interior surface of the windshield, no holes need be added to the aircraft. By utilizing the heating system in the windshield, frozen water on the windshield is melted, thereby allowing the moisture sensor to continue operating during ice and snow conditions.

Figure 1A:
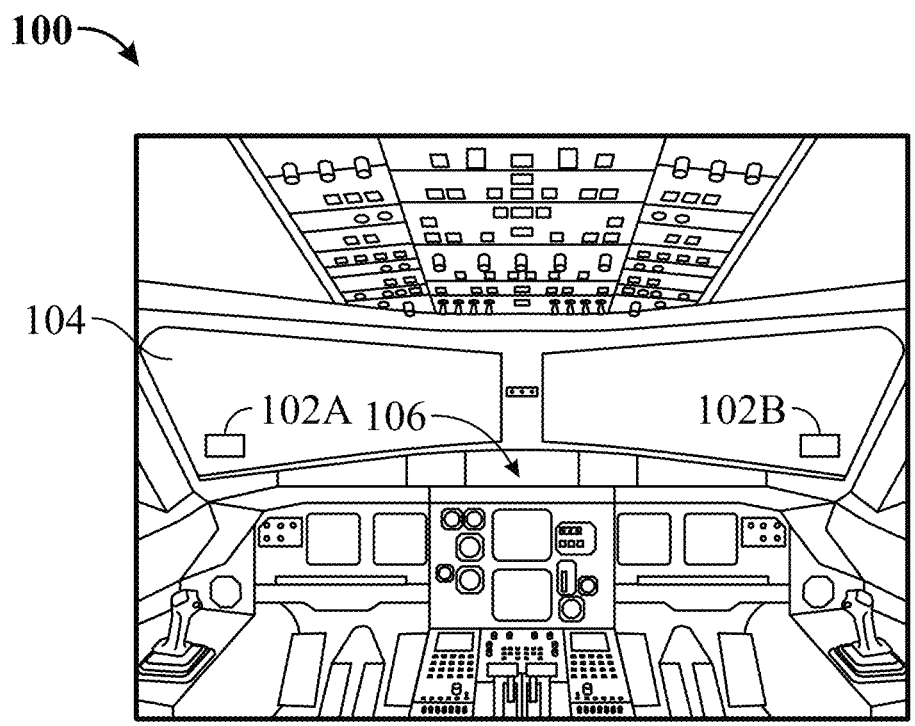
FIG. 1A depicts an example of an interior view of a cockpit, in accordance with one embodiment.

FIG. 1A depicts an example of an interior view of a cockpit 100, in accordance with one embodiment. Cockpit 100 comprises a windshield 104 and control panel 106. On the lower left-hand and lower right-hand corners of the windshield are two moisture sensors 102A and B, respectively. It should be noted that moisture sensors 102A and B could be positioned at any location on the windshield and the left-hand and right-hand corners are given by way of illustration. Further, some embodiments may include one moisture sensor or more than two moisture sensors.

Figure 1B:
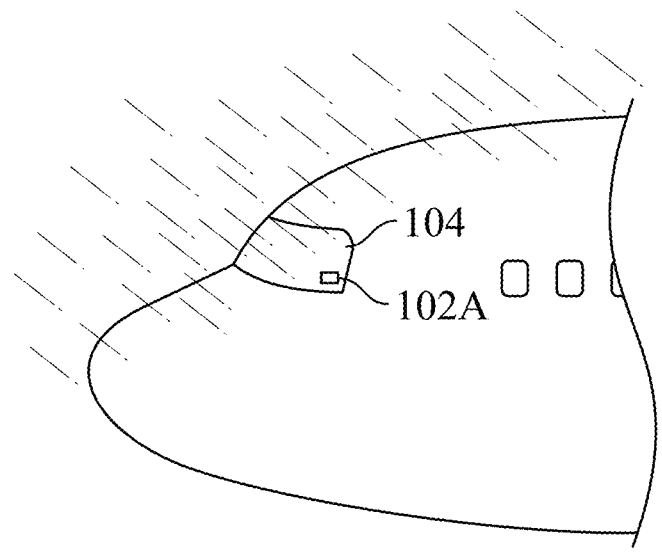
FIG. 1B depicts an example of an exterior view of the front of the aircraft of the embodiment of FIG. 1A.

FIG. 1B depicts an example of an exterior view of the front of the aircraft that houses cockpit 100. As can be seen more clearly in FIG. 1B, moisture sensor 102A is positioned on the interior surface of the windshield 104. Although not visible in FIG. 1B, moisture sensor 102B is similarly positioned on the interior surface of the windshield. By attaching the moisture sensor to the interior surface of the windshield, exemplary embodiments may advantageously detect the presence of moisture without compromising the structural integrity of the aircraft, such as by necessitating a hole be added to the aircraft's fuselage.

Moisture sensors 102A and B may be used to provide a moisture condition (moisture present/moisture not present) to the controller. The controller may also receive an outside temperature. In some embodiments, when moisture is present on the windshield and the outside temperature is at or below freezing, the controller determines that icing conditions are present. The controller may then initiate an alarm or other notification of an icing condition, or may signal de-icing or anti-icing equipment to begin a de-icing or an anti-icing procedure.

Moisture sensors 102A and B may utilize Snell's Law to detect moisture on the windshield. An example of a moisture detector placed on the interior surface of a windshield that utilizes Snell's Law is described in U.S. Pat. No. 5,898,183, the disclosure of which is incorporated by reference herein in its entirety. In some variations, the moisture detector includes an emitter and a detector relatively positioned so that light from the emitter is refracted at an outer surface of the windshield and detected by the detector. Moisture at an outer surface of the windshield reduces the amount of light refracted.

Figure 1C:
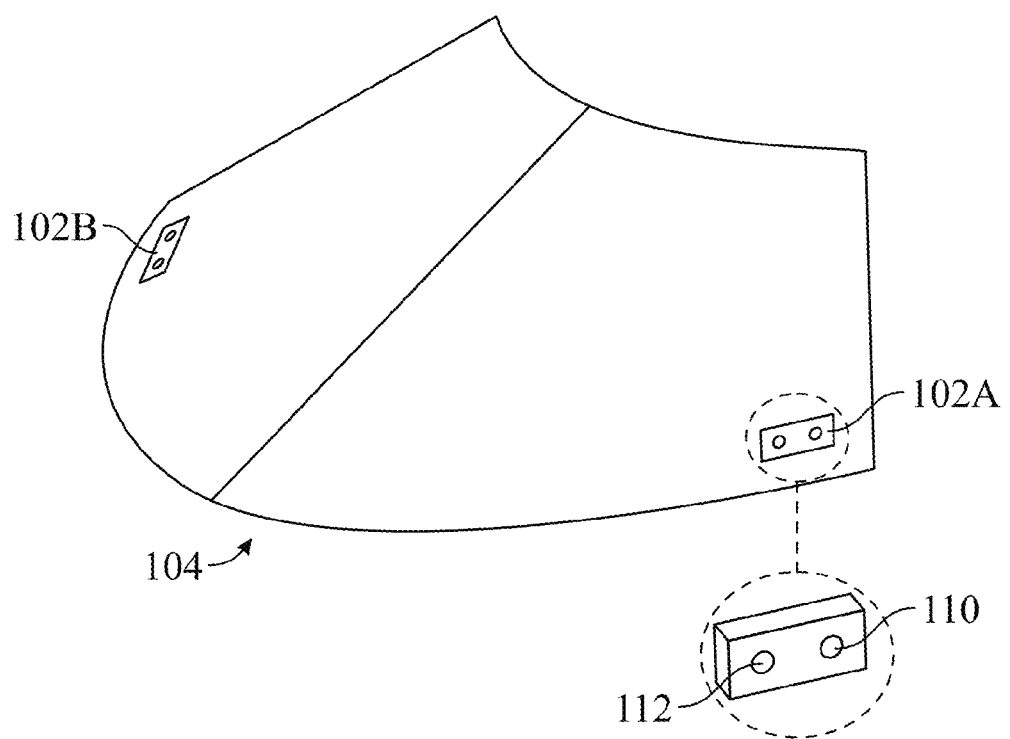
FIG. 1C depicts an example of a closer view of the windshield of FIGS. 1A and 1B.

FIG. 1C depicts an example of a closer view of the windshield 104 of FIGS. 1A and 1B. Moisture sensors 102A and 102B are illustrated in the corners of the windshield. Moisture sensor 102A is cut-out and enlarged for clarity. Moisture sensor 102A includes an emitter 110 and a detector 112. As described above, the emitter 110 and detector 112 can be utilized to detect moisture on the surface of the windshield.

A heating system installed in the windshield may be utilized to ensure that any water molecules on the aircraft windshield remain liquefied, thereby allowing the moisture detector to function in ice and snow conditions. This may remove the need to equip the moisture detector with its own heating system. In one embodiment, the aircraft windshield may be multi-layered. A central transparent layer may be conductive to heat the windshield. The heating system may be manually operated or automatic. The central transparent layer may be surrounded by other transparent layers, examples include tempered glass, acrylic glass, and Lexan™.

In some embodiments, an emitter that is more powerful than an emitter for a single layer window may be used. Similarly, a more sensitive detector may also be used. This may be to compensate for reflections and refractions that may result from multiple layers of glass, which may reduce the effectiveness of the sensor. Some embodiments may also use a radar technique to improve the signal to noise ratio. In one example, an emitter pulse is frequency modulated by a low frequency swept signal "chirp modulation" which is then correlated at the receiving end. This chirp/pulse compression technique can be used to improve the signal to noise ratio of detection through multiple glass layers.

In some embodiments, the outside temperature is provided by an air data computer. The controller may be configured to provide a notification before icing conditions are imminent, such as a degree or two above freezing coupled with the presence of moisture on the windshield.

In some embodiments, the determination of icing conditions may be adjusted to account for variances in altitude and other environmental conditions. For example, the freezing point of water increases with altitude (due to pressure decrease with altitude). Also, the freezing point of water may decrease with altitude because the purity of water may be greater at higher altitudes. For example, super cooled droplets may cause severe icing very quickly. Even though the droplets are in air that is below freezing the droplets need a disturbance to change from liquid to solid. The impact of the aircraft hitting the super cooled droplets may cause the water droplets to quickly build up ice on the aircraft. These and other environmental considerations may be factored into the icing conditions determination.

The air data computer may provide an outside air temperature or a Total Air Temperature (TAT) due to impact air temperature rise (Ram Air Temperature) for relatively high speed aircraft (subsonic jet). By utilizing the air data computer, additional temperature sensors need not be added to the aircraft.

The icing conditions detectors described herein may be particularly advantageous in aircraft certified for flight into known icing ("FIKI"). FIKI aircraft are typically equipped with heating systems on the windshield and must be capable of detecting icing conditions.

In some embodiments, an "Advisory System" may be initiated following detection of icing conditions. In such embodiments, the flight crew is alerted to the presence of icing conditions, and the flight crew then determines what, if any, actions are necessary to mitigate the situation. For example, the crew may request a different altitude to get into warmer air, turn on airframe anti-icing equipment, or just monitor the situation and see if it continues to progress or subsides. In other embodiments, a "Primary System" may include a signal to the aircraft anti-icing equipment. The anti-icing equipment may be automatically activated to prevent ice from building up on the critical surfaces, such as engine inlets. Some embodiments may include both an Advisory System and a Primary System.

Figure 2:
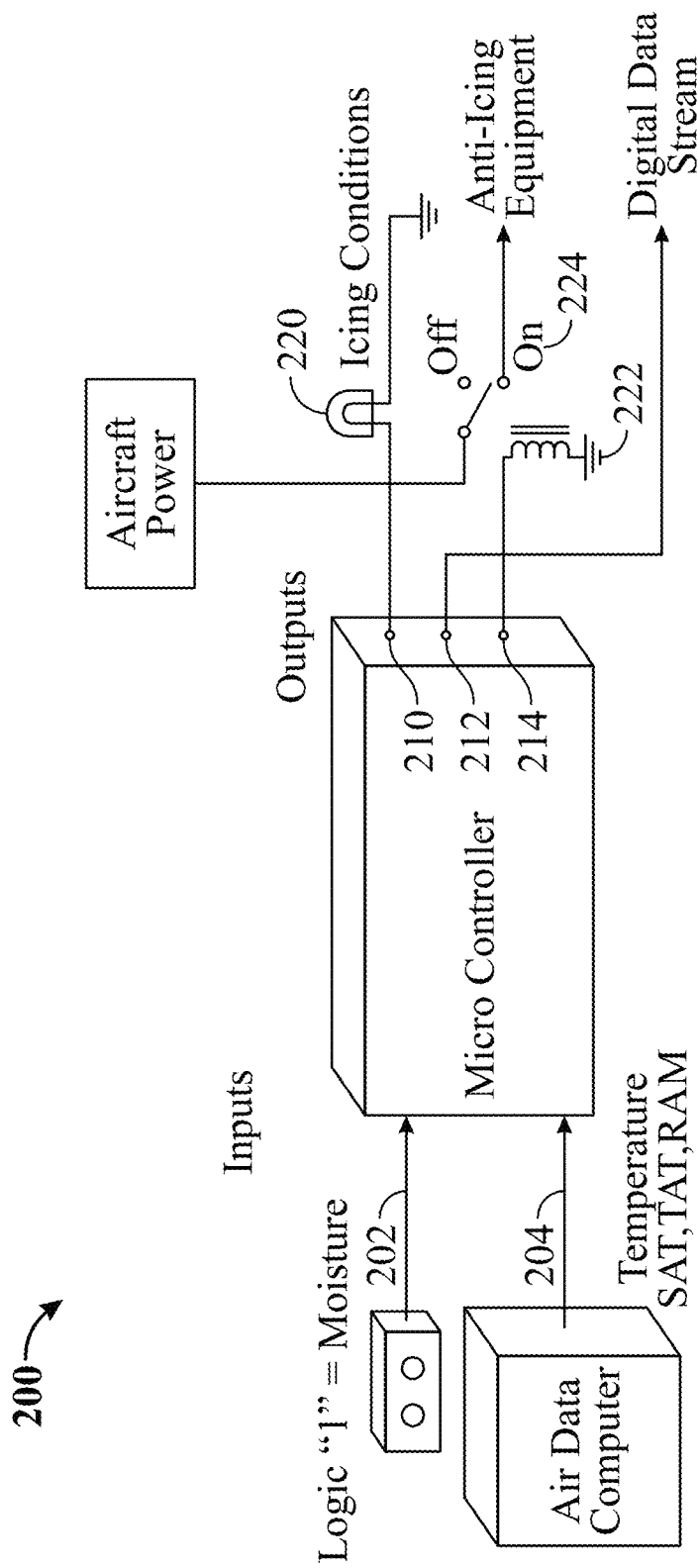
FIG. 2 depicts an example of logic for detecting icing conditions on an aircraft using an input from a moisture detector on the interior surface of an aircraft windshield and an input from an outside temperature sensor, in accordance with one embodiment.

FIG. 2 depicts an example of logic 200 for detecting icing conditions on an aircraft using an input from a moisture detector on the interior surface of an aircraft windshield and an input from an outside temperature sensor, in accordance with one embodiment. A microcontroller receives inputs 202 and 204. Input 202 provides logic ("1" or "0") from the moisture sensor positioned on the interior of the aircraft windshield. Input 204 is a temperature provided by the air data computer. In the embodiment of FIG. 2, temperature may be provided in any one of SAT, TAT, and RAM. It will be understood by those of skill in the art that the present disclosure is not limited to a particular type of temperature report.

The microcontroller provides outputs 210, 212, and 214. Output 210 provides an alert to the aircraft crew that icing conditions exist. In the example of FIG. 2, output 210 is connected to a visual alarm 220. In some embodiments, audio or computer based alarms may be used. Output 212 provides information to an aircraft computer system through a digital data stream. Output 214 provides a signal to anti-icing equipment. Power to the anti-icing equipment may be controlled by a switch 224. Output 214 may also be connected to relay 222, which may prove beneficial for high current requirements in some applications.

It is understood that logic 200 is offered by way of an example, and other systems could be used to implement the systems and methods described herein. Such systems may include computer-based systems.

Figure 3:
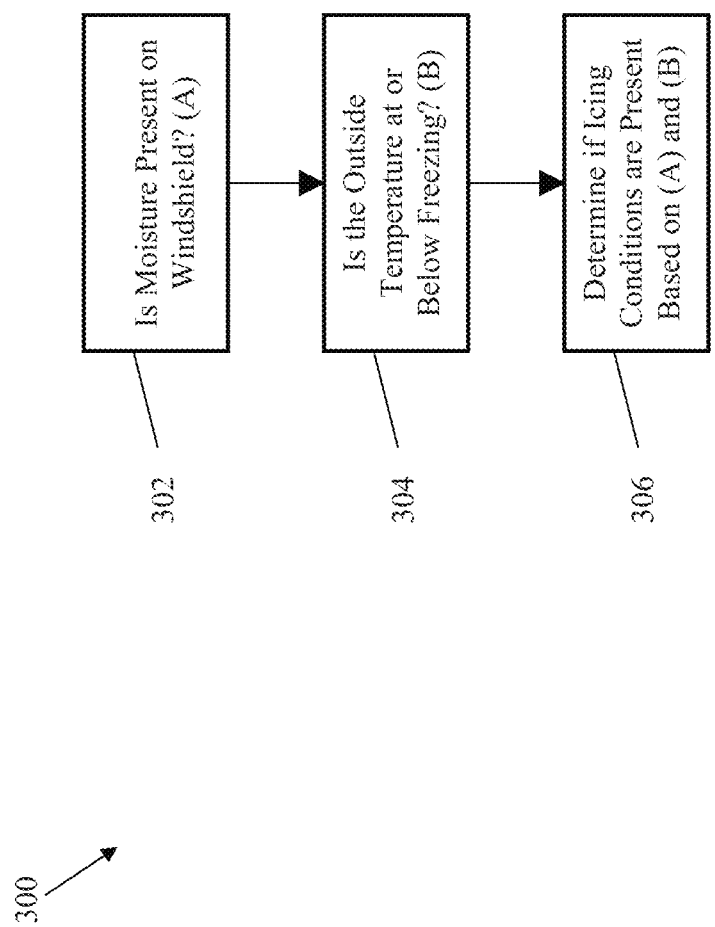
FIG. 3 depicts an example of a method of detecting icing conditions on an aircraft, in accordance with one embodiment.

FIG. 3 depicts an example of a method 300 of detecting icing conditions on an aircraft, in accordance with one embodiment. Method 300 includes determining 302 if moisture is present on the windshield of the aircraft, determining 304 if the outside temperature is at or below freezing, and determining 306 if icing conditions are present based on the determinations made in steps 302 and 304. In method 300, the determining step 302 is facilitated by a moisture sensor positioned on the interior surface of the aircraft. In some embodiments, the windshield includes a heating system.

In another embodiment, icing conditions can be determined when moisture is determined to be present on the windshield and the outside temperature is determined to be at or below freezing. In yet another embodiment, the presence of moisture can be determined using Snell's Law.

In some embodiments, the method may also include activating a de-icing or anti-icing system in the aircraft to initiate de-icing or anti-icing when icing conditions are determined to be present. In some embodiments, determining the outside temperature comprises accessing an air data computer.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A controller that determines an icing condition on an outer surface of an aircraft comprising:
    a first input that receives a moisture condition on an outer surface of a windshield of the aircraft, wherein the condition is provided by a moisture sensor positioned on an interior surface of the windshield, wherein the windshield comprises a heating system,
    a second input that receives an outer ambient temperature, and
    an output that provides an icing condition, wherein the presence of an icing condition is determined as a function of the first input and the second input.

2. The controller of claim 1, wherein the presence of an icing condition is determined when the first input indicates that moisture is present on the windshield and the second input indicates that the outer ambient temperature is at or below freezing.

3. The controller of claim 1, wherein the moisture condition is determined by utilizing an emitter and a detector relatively positioned so that light from the emitter is refracted at the outer surface of the windshield and detected by the detector.

4. The controller of claim 1, wherein the output comprises a signal to a de-icing or anti-icing system in the aircraft to initiate de-icing or anti-icing.

5. The controller of claim 1, wherein the second input is provided by an air data computer.

6. An aircraft icing condition detector comprising:
    a moisture sensor positioned on an interior of a windshield of the aircraft, the windshield comprising a heating system,
    an outer ambient temperature sensor, and a controller that determines an icing condition as a function of moisture detected by the moisture sensor on an outer surface of the windshield and temperature detected by the outer ambient temperature sensor.

7. The aircraft icing condition detector of claim 6, wherein the controller determines an icing condition when the moisture sensor determines moisture is present on the windshield and the outer ambient temperature sensor determines the outer ambient temperature is at or below freezing.

8. The aircraft icing condition detector of claim 6, wherein the moisture sensor comprises an emitter and a detector relatively positioned so that light from the emitter is refracted at the outer surface of the windshield and detected by the detector.

9. The aircraft icing condition detector of claim 6, wherein the moisture sensor does not comprise an independent heating system that melts frozen water.

10. The aircraft icing condition detector of claim 6, wherein the controller activates a de-icing or anti-icing system on the aircraft when the controller determines that an icing condition is present.

11. The aircraft icing conditions detector of claim 6, wherein the outer ambient temperature sensor comprises a probe connected to an air data computer.

12. A method of detecting icing conditions on an aircraft comprising:
    determining a presence of moisture on an outer surface of a windshield of the aircraft using a moisture sensor positioned on an interior surface of the windshield, the windshield comprising a heating system,
    determining an outer ambient temperature, and
    determining an icing condition as a function of the presence of moisture on the windshield and the outer ambient temperature.

13. The method of claim 12, wherein determining an icing condition comprises determining a presence of moisture on the windshield and determining if the outer ambient temperature is at or below freezing.

14. The method of claim 12, wherein determining a presence of moisture on the windshield comprises utilizing an emitter and a detector relatively positioned so that light from the emitter is refracted at the outer surface of the windshield and detected by the detector.

15. The method of claim 12, comprising activating a de-icing or anti-icing system when icing conditions are determined to be present.

16. The method of claim 12, wherein determining the outer ambient temperature comprises accessing an air data computer for at least one of Outside Air Temperature, Static Air Temperature, Total Air Temperature or RAM air temperature.

17. An aircraft icing condition detector comprising: a moisture sensor associated with an interior surface of a heatable windshield of the aircraft, an outer ambient temperature sensor, and a controller that determines an icing condition as a function of moisture detected by the moisture sensor on an outer surface of the windshield and temperature detected by the outer ambient temperature sensor.

18. The method of claim 12 wherein determining a presence of moisture comprises using chirp modulation and pulse compression or signal matching.

* * * * *